(12) United States Patent
Veverica et al.

(10) Patent No.: US 6,820,505 B2
(45) Date of Patent: Nov. 23, 2004

(54) MECHANICAL SAFETY FUSE LINK (75) Inventors: Mark A. Veverica, Lafayette, LA (US); Charles Michael Webre, Lafayette, LA (US); Cory J. Cole, Breaux Bridge, LA (US)

(73) Assignee: Frank's Casing Crew and Rental Tools, Inc., Lafayette, LA (US)

( * ) Notice: Subject to any disclaimer, the term of this patent is extended or adjusted under 35 U.S.C. 154(b) by 0 days.

(21) Appl. No.: 10/135,923

(22) Filed: Apr. 29, 2002

(65) Prior Publication Data
US 2003/0200819 A1 Oct. 30, 2003

(51) Int. Cl.[7] ................................................ G01L 1/26
(52) U.S. Cl. ................................................ 73/862.393
(58) Field of Search .......................... 73/862.393, 826, 73/831, 832, 837, 862.392

(56) References Cited

U.S. PATENT DOCUMENTS

| | | | |
|---|---|---|---|
| 4,155,250 A | * | 5/1979 | Durner ...................... 73/54.39 |
| 4,217,776 A | | 8/1980 | McCall |
| 4,330,926 A | | 5/1982 | McCall |
| 4,573,537 A | * | 3/1986 | Hirasuna et al. ............. 166/387 |
| 4,832,315 A | * | 5/1989 | Vanderklaauw ........... 254/89 H |
| 5,957,198 A | * | 9/1999 | Haynes .................. 166/250.03 |
| 6,073,496 A | * | 6/2000 | Kuhn et al. ............... 73/862.56 |
| 6,076,867 A | * | 6/2000 | Dollman et al. ............. 292/174 |
| 6,101,702 A | * | 8/2000 | Claycomb et al. .......... 29/426.4 |
| 6,568,730 B1 | * | 5/2003 | Paterson ...................... 294/89 |

* cited by examiner

Primary Examiner—Max Noor
(74) Attorney, Agent, or Firm—John D. Jeter

(57) ABSTRACT

A serial element of a load lifting line has a telescoping body held in a short configuration by a linear slip clutch until a selected load on the line is exceeded. The slip clutch then allows the body to extend to a longer configuration in which it is retained as a length unit by abutting surfaces between which an elastomeric shock cushion is positioned. An optional arrangement includes a biasing provision to restore the link to the original condition, for further use, after the load is reduced. By utilizing optional provisions, the link can signal the overload condition by a whistle when the telescoping body extends. Visible signals can, optionally, be provided by members that extend from the body when the body is telescoped to the longer condition.

16 Claims, 7 Drawing Sheets

MECHANICAL SAFETY FUSE LINK

This invention pertains to an overload indicating link usable as a serial element in a lifting line. More particularly, it pertains to a link that will telescope to a longer length when a linear slip clutch releases or a replaceable shear pin fails. As an option, a swivel function can be provided in the fuse housing. Arrangements for audible and visual indications of overload are disclosed.

BACKGROUND OF INVENTION

It is commonplace in most load lifting systems to use slings and lines with less lifting capacity than the hoisting gear. If the load has been underestimated or is hung up on other masses, the light tackle involved often breaks with consequence that can be life threatening. The oil industry provides an example.

When the main hoist system of a drilling rig is used to lift small loads, lines and slings of modest capacity are connected to the load and to the traveling block. If the load gets hung, the traveling block of the massive draw works will part the lifting line and drop the load.

City construction cranes and helicopters often lift loads not fully visible at the time first lifting forces are applied.

There is a need for a warning system that will clearly indicate that an over-limit load has been encountered. A linkage with a linear slip clutch, or a breakable element, that will part and allow the load to move a few inches before being stopped by safety elements will generally shock the lifting system. The shock will alert control personnel and invite alternate load management actions. In high noise level areas, a visible overload indicator system is appropriate. In quiet areas where a sound producing overload signal can be heard, sound producing overload responsive gear is needed.

SUMMARY OF INVENTION

It is an object of this invention to provide a lifting line safety link that will respond to a load exceeding a preset limit by extending a predetermined amount but retain needed lifting ability at the extended length.

It is another object to provide means to restore the safety link to the original configuration with minimal effort.

It is still another object to provide a safety link that restores itself automatically when the load is reduced.

It is yet another object to provide visual or audible indications that the safety link has been overloaded.

There is a preferred embodiment for each of several load ranges, and for each likelihood of overload. When overload rarely occurs, it is appropriate to use shear pin failure as the initiating mechanism. If overload often occurs, especially in cases that are very dangerous or delays are expensive, the cost of linear clutches is justified. The principal structures for each can be quite similar, and they are provided.

The means to safely allow a telescoping body to extend having been established, the need to provide visual or sound indicators of overload arose. That need produced signal means that can be used selectively on the elected housings.

The preferred embodiment for use in limited equipment circumstances is a link, with lifting line attachment means at opposite ends and a telescoping body. A shear pin in a cross bore axially secures the telescoping body in the shortened configuration. When a preselected amount of load is applied to the ends of the body, the shear pin parts and the body telescopes to a longer length. The body has a travel limiting abutment to prevent separation of the body. An optional sleeve retains the shear pin before failure, and the severed shear pin ends after failure.

In the linear slip clutch version, members in an interference arrangement hold the telescoping body in the shortened state until load exceeding a preselected amount is experienced and causes resilient elements to distort to allow the interfering elements to pass. In these simple versions, the offending load is removed and the telescope is pushed back to the shortened state to restore the interfering situation between elements that prevent extension of the body. In the automatic re-setting version, bias means forces the body to telescope back to the shortened state when load is reduced to a selected amount.

On any of the housings involved, as indicated above, an optional wing-like indicator vane arrangement extends to signal operators above that overload has occurred. The vanes fold when the lengthened body is shortened again.

An option, usable alone or in combination with visual indications, provides a loud shriek when overload occurs. The preferred telescoping bodies, however secured in the shortened state, can function as piston and cylinder arrangements. When overload extension occurs, it represents considerable energy briefly available. The internal parts move fast relative to the body and define a variable volume enclosure. To allow air to be expelled from the suddenly shrinking variable volume enclosure, a whistle-type escape is provided. It is essentially a copy of the air passages of pressure can powered boat horns.

An alternate form of the invention provides a swivel as part of the telescoping body. The swivel performs the conventional function of a separate swivel usually used to allow the lifting line to twist, or unwind, without spinning the payload being lifted. It is also used in cases needing payload rotation not permitted by the hoist gear itself.

These and other objects, advantages, and features of this invention will be apparent to those skilled in the art from a consideration of this specification, including the attached claims and appended drawings.

DETAILED DESCRIPTION OF DRAWINGS

Ideally, the housings of all versions presented herein will, by design, accept perhaps ten times the load required to fail the pin or slip the clutch, and the telescoping action will shock the lifting system to invite attention to needed actions. It will, however, not separate under planned overload limits.

Figure 1:
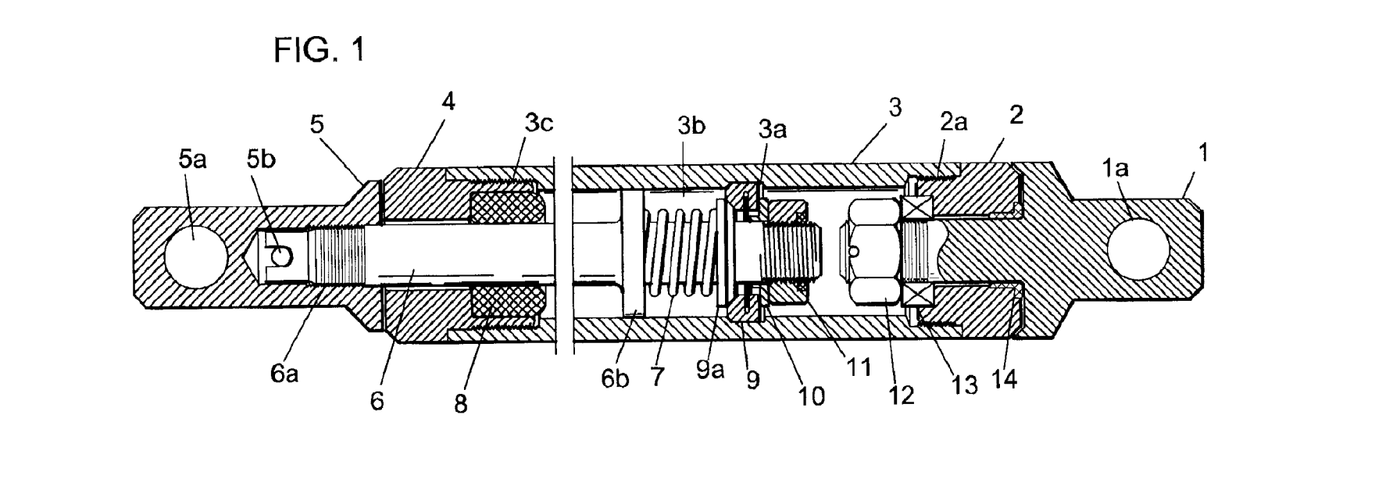
FIG. 1 is a side view, mostly in cut-away, showing a preferred embodiment.

In FIG. 1, terminal 1 has clevis pin hole 1a and an extension extending through radial bearing 14 and thrust bearing 13, retained by nut 12. End cap 2 threadedly attached to tube 3, which is threadedly attached to lower end cap 4, forms an enclosure. In the enclosure, rod head 6 is secured to the housing by resilient collet 9 which is radially spread by cone 9a, under thrust by spring 7, to engage groove 3a. Nut 11, on rod 6, acting through washer 10, captures the collet and adjusts the load applied by spring 7.

Lower terminal 5 has clevis pin hole 5a and rod receiving threads 6a, which are safety locked by pin 5B. The lower terminal is threadedly attached to rod 6. When axial load pulls collet 9 out of ring groove 3a the head can only travel as far downward as resilient shock sleeve 8 and guide 6b permits. When the body has telescoped to the maximum length, rod 6 conspicuously extends from end cap 4. The visible rod is an output signal and a clear indicator that the safety link has been overloaded. See FIG. 16 for the extended condition.

Figure 12:
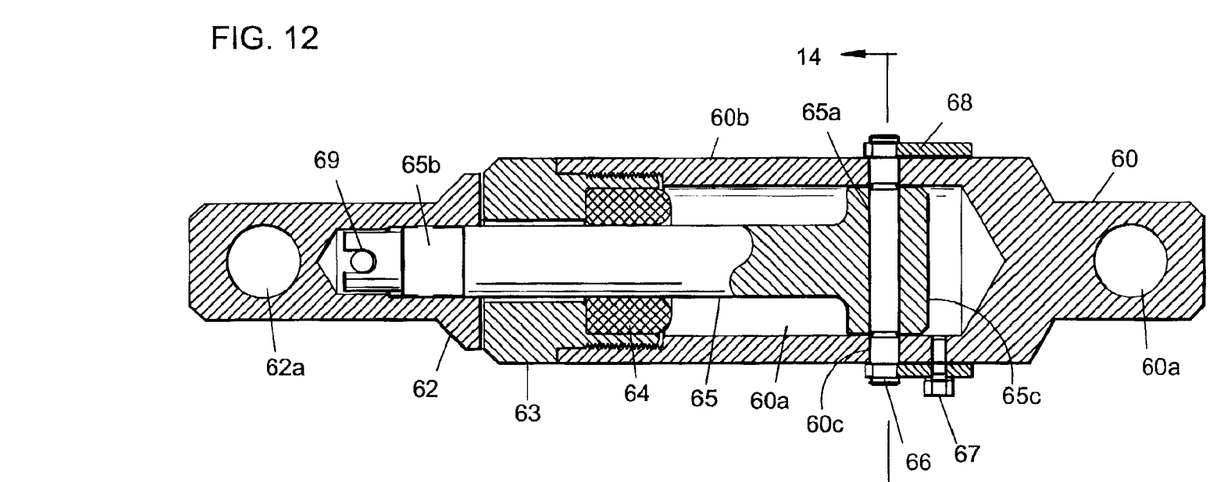
FIG. 12 is a side view, mostly in cut away, of the simplest form of the invention.

The swivel is optional and the upper end can be rigid and similar to the upper end of FIG. 12.

Figure 2:
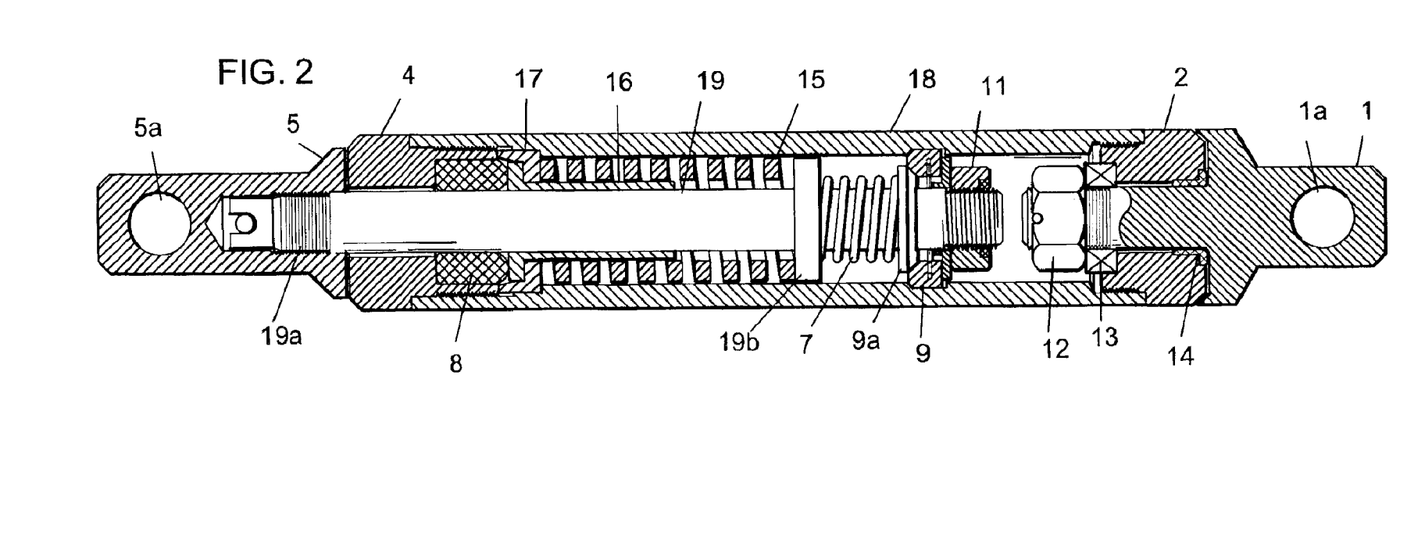
FIG. 2 is a side view, mostly in cut-away, of the self re-setting version of the invention.

FIG. 2 shows the apparatus of FIG. 1 elongated to accept a spring to close the extended apparatus when the axial stress load is reduced. Only the changed components add to the descriptive matter for FIG. 1. Spring 15 requires a longer tube 18 and a longer rod 19. Ferrule 16 transmits the shock load from guide 19b to the elastomer absorber 8. Thimble 17 supports the spring 15.

Figure 3:
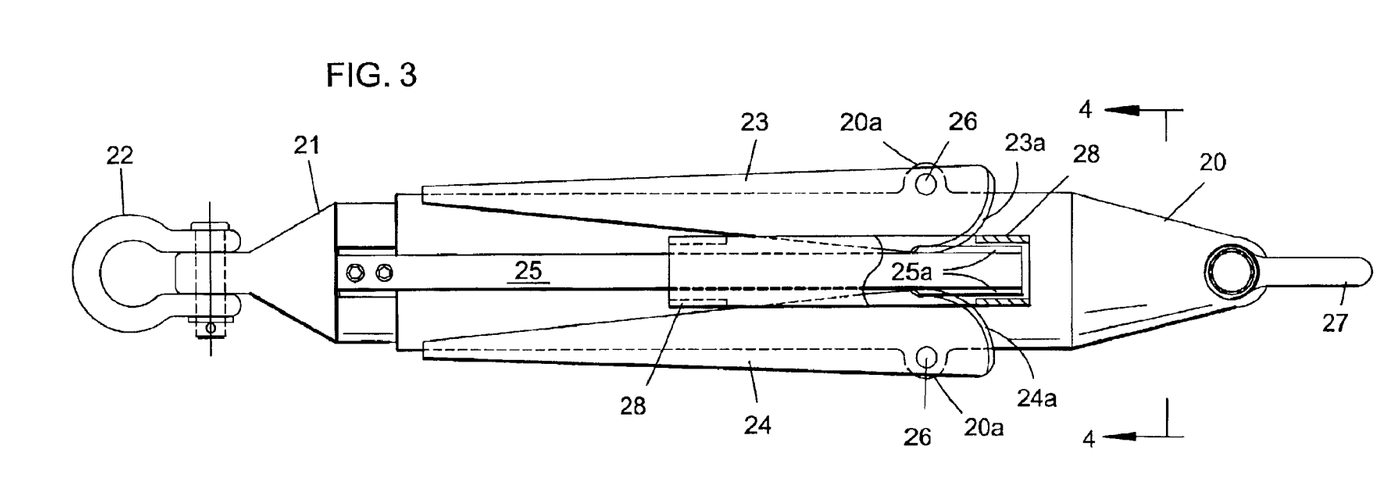
FIG. 3 is a side view of a visual indicator version in the normal state.
Figure 5:
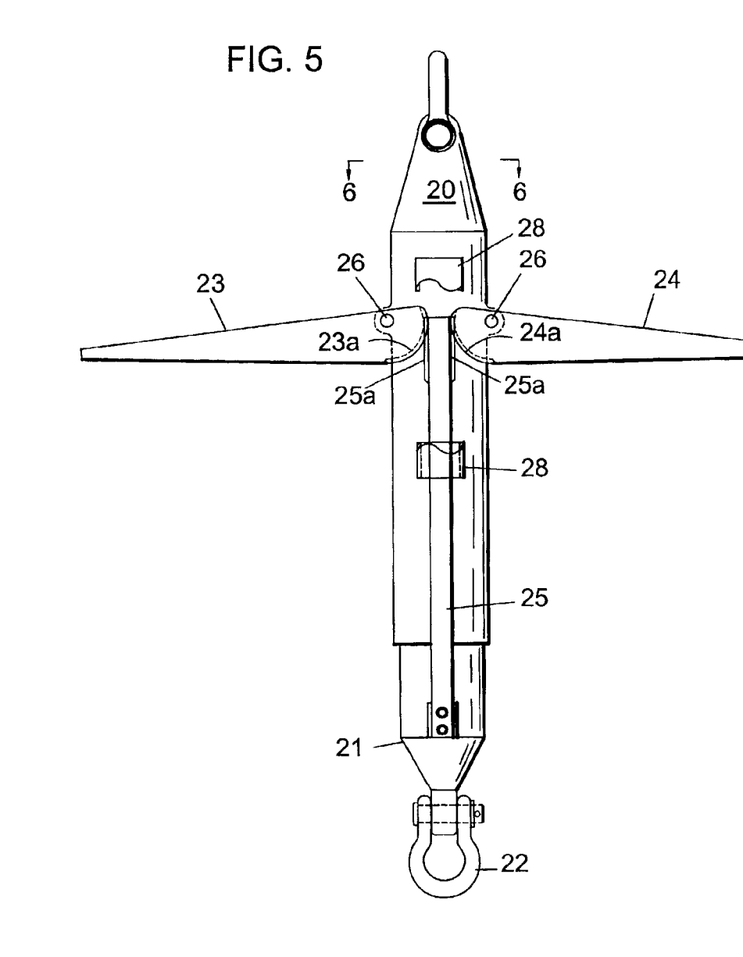
FIG. 5 is a side view of FIG. 3 with overload indicators deployed.

FIGS. 3 and 5 represent side views of visual overload indicator means attached to a safety fuse link that may be considered symbolic of any one of the envelopes related to disclosed apparatus. When the served apparatus is overloaded, the signals deploy and they retract when the condition is corrected.

Figure 6:
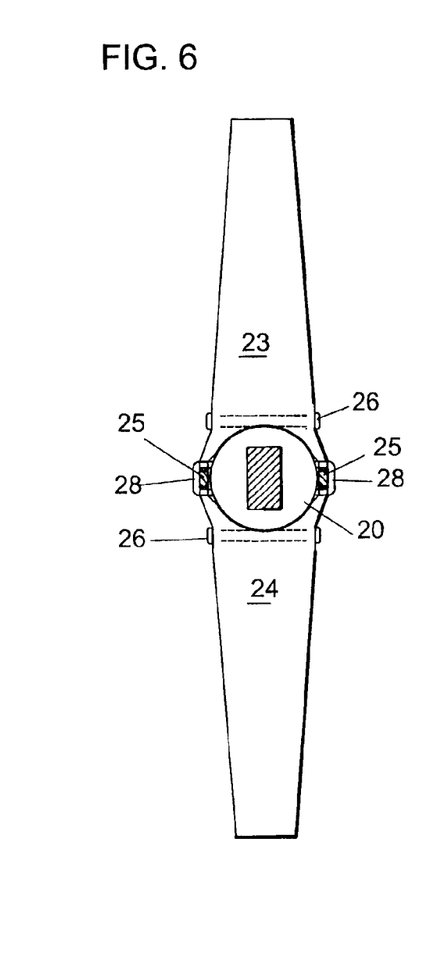
FIG. 6 is a top view of FIG. 5 taken along line 6—6.

Upper body 20 houses the chosen overload responding link, which may be the swivel version of FIGS. 1 and 2. Clevis 27 is the upper means for connecting to hoisting gear. Clevis 22 is the means for attachment to a suspended load. Generally cylindrical members 20 and 21 are a telescoping pair of elements. Channel forming members 28 houses a rod 25 which has rack teeth 25a that engage pinion teeth 23a and 24a on vanes 23 and 24 respectively. The vanes are supported by and pivot around shafts 26 which are supported in trunnion pillows 20a on member 20. When member 21 moves downward due to overload, attached rod 25 moves downward to deploy the vanes 23 and 24 as shown by FIGS. 5 and 6. There is one rod 25 on each side. If time proves that the shock of sudden extension of the body damages the vanes or deploying elements, a spring will be added to allow rod 25 to effectively stretch temporarily to reduce shock loads.

Figure 4:
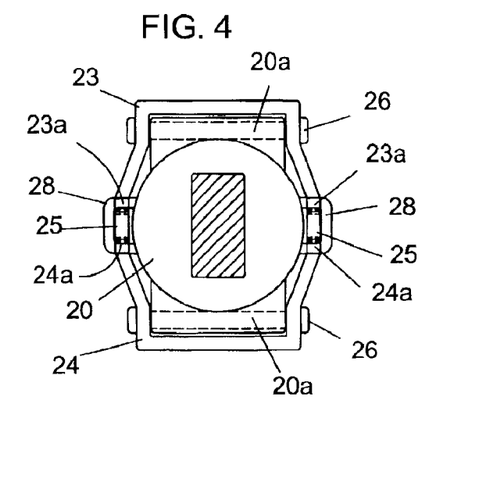
FIG. 4 is a sectional view taken along line 4—4 of FIG. 3.

FIGS. 4 and 6 are sections taken along lines 4—4 and 6—6. They show press formed vanes 23 and 24 that have pinion teeth 23a and 24a that mesh with rack teeth 25a on each side of each rod 25. Channel forming members 28 have open sides to admit the pinion protrusions of the vanes.

Figure 7:
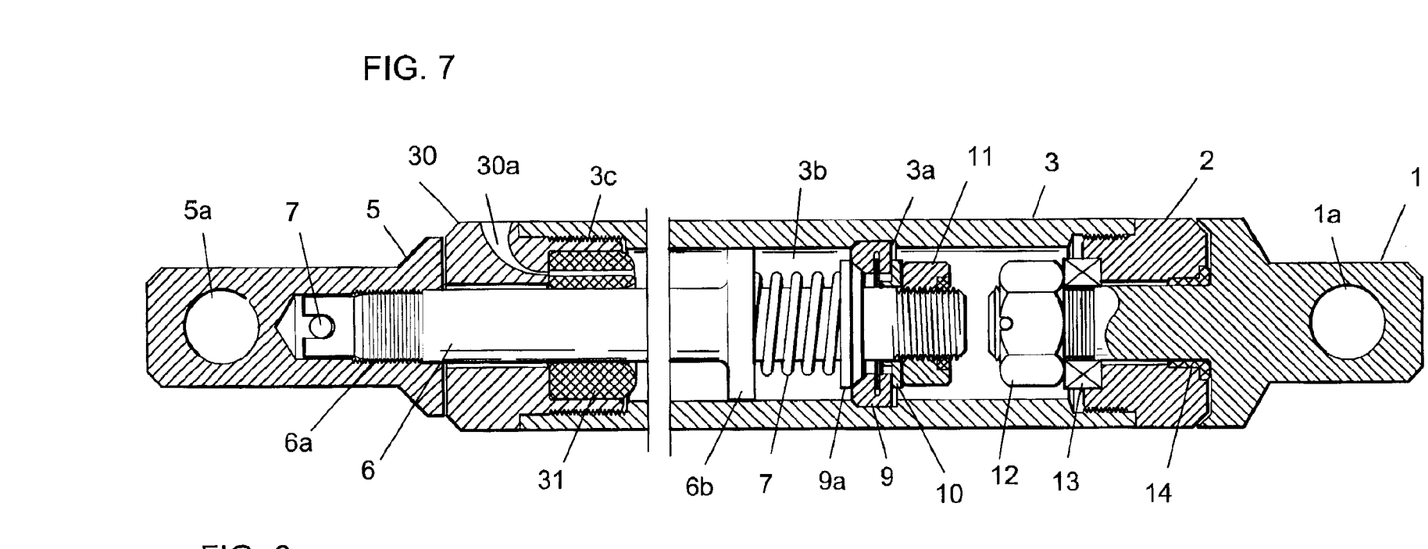
FIG. 7 is a side view, mostly cut away, similar to FIG. 1 but with a whistle alarm system.

FIG. 7 is identical with FIG. 1 except that it has audible alarm sounding means. The adaptation involves the provision of the sound making channel 30a, in end cap 30. It is in essence the sound producing features copied from a pressure can fitting (and powered) boat whistle. This version is otherwise identical with FIG. 1.

Figure 8:
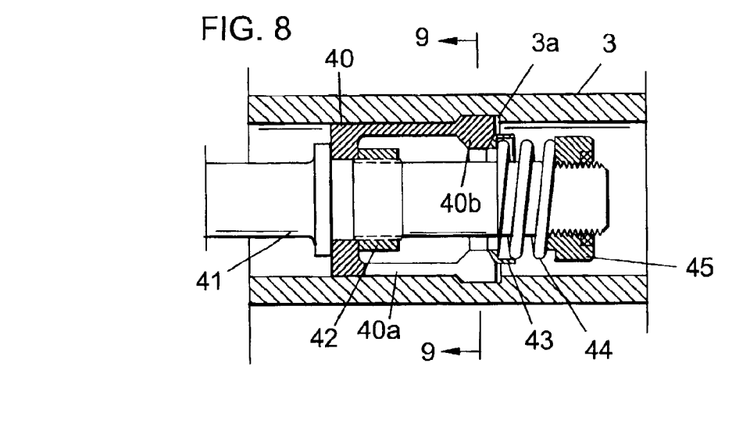
FIG. 8 is a fragmented side view, mostly in cut away, of a precision release load adaptation for various embodiments.

In FIG. 8, a finger collet is used to provide a slip clutch element that requires minor changes in the configuration of typical machine tool collets to enable a precision load limiting means. Rod 41 extends through nut 45 to enable the adjustment of spring 44. Ferrule 43 transmits radial load to fingers 40a which have heads 40b extending into and gripping groove 3a. Annular nut 42 holds the collet on the rod. The collets are less inclined to score the inner cylindrical surface of the tube 3, when excess loads are often experienced, than the segmented rings such as 9 of FIG. 7.

Figure 9:
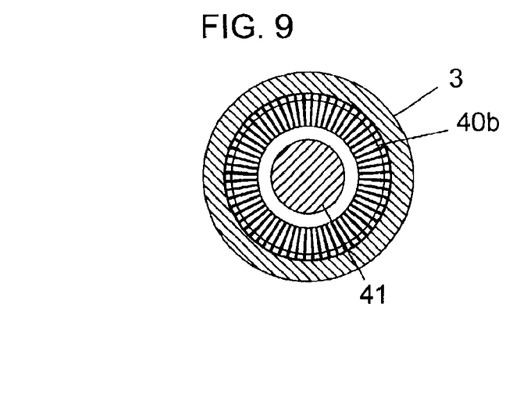
FIG. 9 is a sectional view taken along line 9—9 of FIG. 8.

FIG. 9 shows the ends of fingers 40 and their collective relationship to rod 41.

Figure 10:
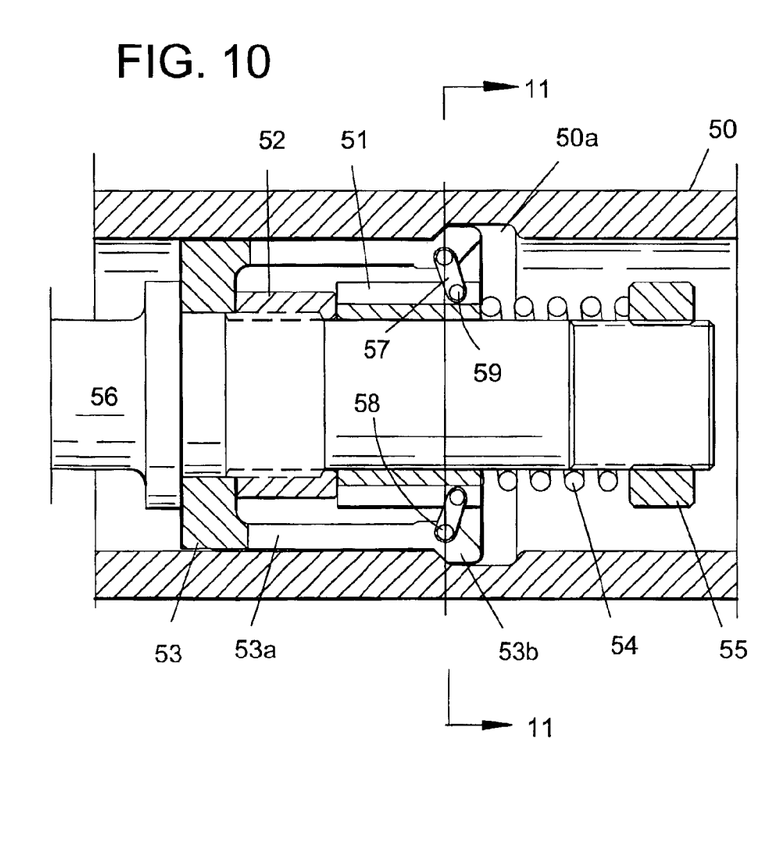
FIG. 10 is a fragmented side view, mostly in cut away, of a large-load arrangement of the telescoping body linear slip clutch.
Figure 11:
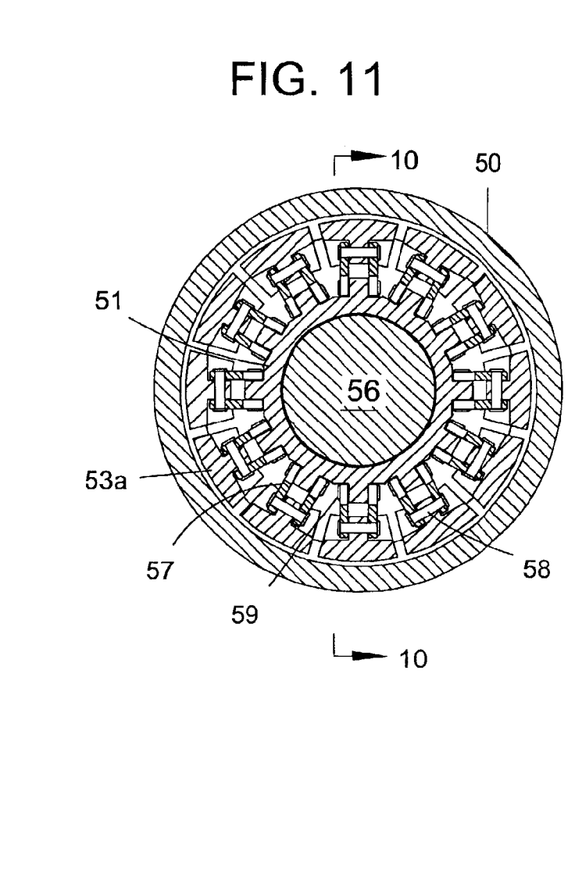
FIG. 11 is a sectional view taken along line 11—11 of FIG. 10.

FIGS. 10 and 11 show a configuration necessitated by very large lifting systems. In arrangements using tapered loading systems such as the element 9 and 9a combinations of FIG. 7, the spring 7 causes collet elements riding the wall of the bore of tube 50 to overload the surfaces and cause scoring or galling. The spring provides a large percentage of the lifting capacity of the safety link, and that load increases when the clutch elements move out of the wall groove. In FIG. 10, the links 57 and 58 are typical of the overall complement of such links. They are, conveniently, transmission chain side links. Viewed in extreme, the links would demand nothing of spring 54 if they extended in a purely radial direction between pins 58 and 59 but they would have no calibration influence, and would have no adjustable release ability. To provide link angle control, the abutment of link carrier 51 and nut 52 establishes the angle off radial that defines the strength needed of spring 54. When the hoisted axial load pulls the collet finger heads 53b, in fingers 53a of collet 53, out of groove 50a the radial force derived from the spring, through the links, diminishes because of the changing angle of the links. By design, the effect of spring 54 can go to zero, after clutch release, if the links 57 become purely axial in direction after the finger heads are in position to move along the cylindrical bore of tube 50. Cylindrical wall unit loading can be limited to that produced by the spring action of the collet fingers. Nut 55 on rod 56 provides adjustment means for spring 54.

The member 51 is arranged such that pins 59 (see FIG. 11) cannot be inserted from the side, to move into the receiving hole. Member 51 is made in two parts, not shown, that splits the hole for pin 59 along the hole axis. The pins are always loaded in compression, mostly radial, and the second part of member 51 need only to retain the pins in the half shell of the receiving hole.

Figure 13:
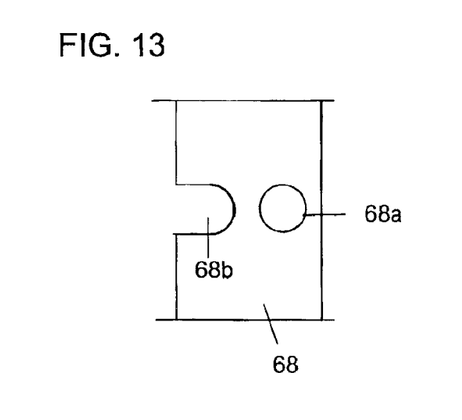
FIG. 13 is a fragmented side view of part of FIG. 12.
Figure 14:
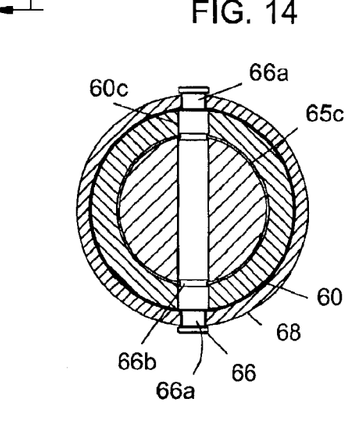
FIG. 14 is a sectional view taken along line 14—14 of FIG. 12.

FIGS. 12, 13 and 14 show the simpler version of the safety fuse link. FIG. 12 can be identical to FIG. 1 below (leftward of) the shear pin. No swivel is used and end cap 60, or terminal 1, and tube 60b are combined for one-piece construction. Bore 60a in component 60 produces tube 60b, and crossbore 60c receives the shear pin 66. Sleeve 68 is detailed, in terms of functional features, by FIG. 13. It retains the shear pin in place before failure, and retains the shear pin ends after failure. Hole 68a receives cap screw 67 and slot 68b engages groove 66a on the shear pin 66.

Figure 16:
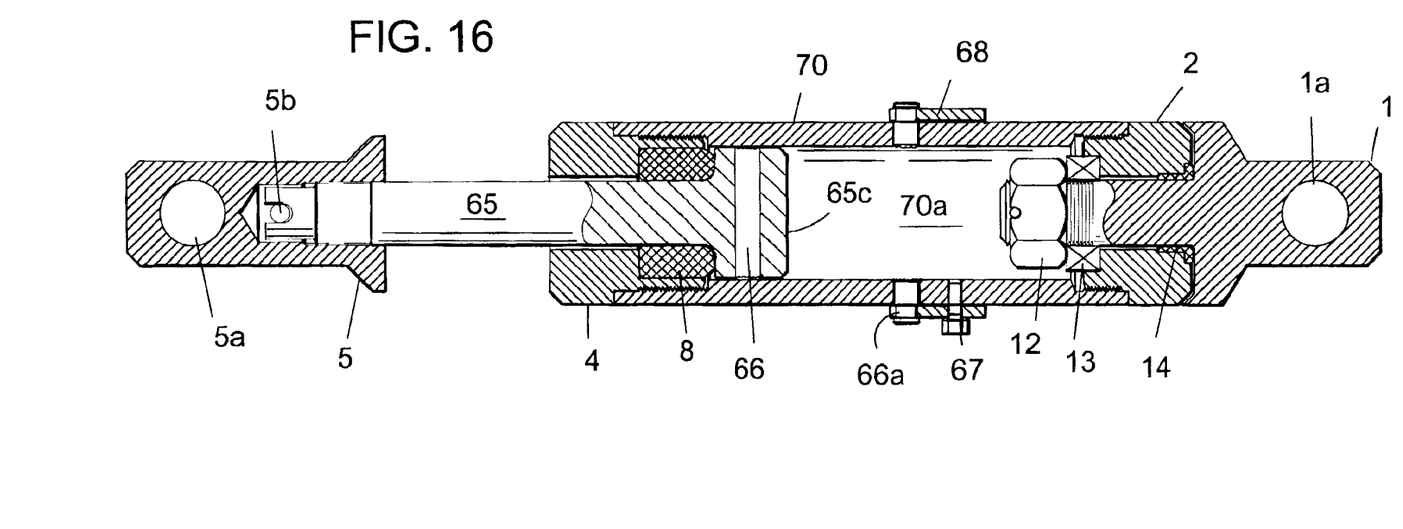
FIG. 16 is identical with FIG. 15, but extended.

When shear pin 66 fails due to overload, rod 65 moves leftward until head 65c hits the elastomer cushion 64 in end cap 63. FIG. 16 amply illustrates the extension configuration.

Load terminal 62 has threads to engage rod end 65*b*, locked by pin 69, to support a load by way of a clevis (not shown) engaging hole 62*a*.

Figure 15:
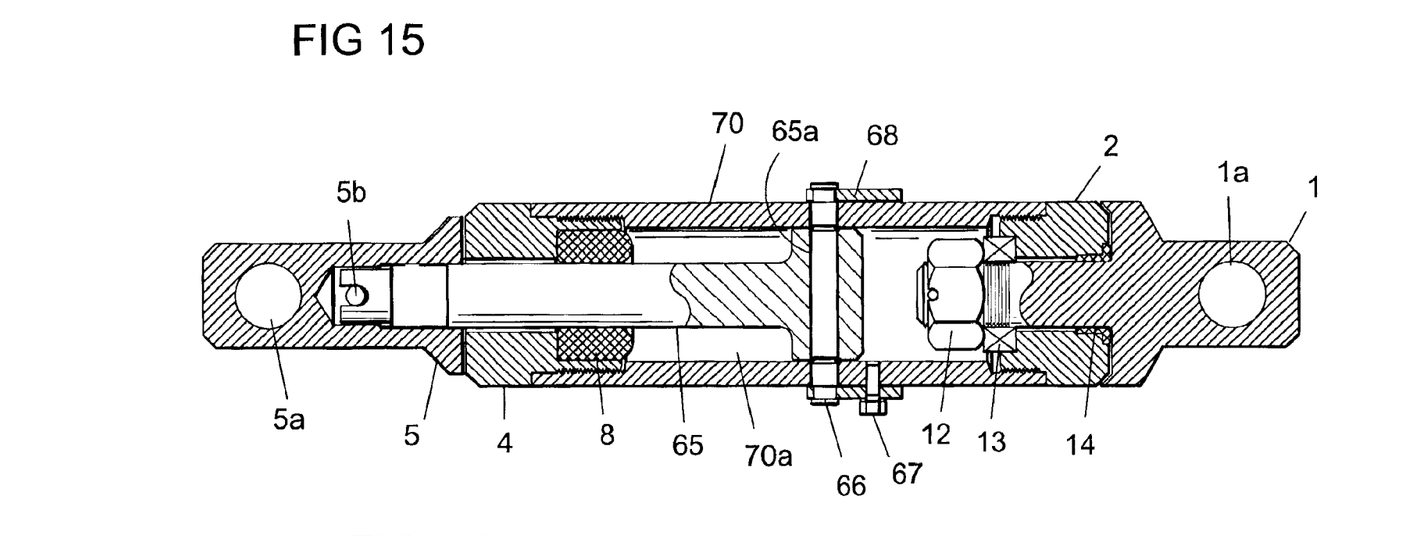
FIG. 15 is a side view, mostly in cut away, of one embodiment.

FIGS. 15 and 16 show swivel fitted versions of the shear pin load limiting arrangement of FIG. 12. FIG. 16 is the apparatus of FIG. 15 but allowed to extend by failure of shear pin 66. The swivel is the same as that for FIG. 1 and has similar captions. The second terminal 5, and related features have the FIG. 1 captions. Tube 70 threadedly connects end caps 2 and 4. All other features have been explained.

It is to be noted that some sizes of the safety fuse link lend themselves well to making the telescoping members of rectangular cross section. Such shapes allow spring loaded rolling pins, restrained in grooves, to be used in slip clutch construction. Pins used as rolling elements can be loaded along their cylindrical element lines to reduce concentrated surface loading. Such arrangements are anticipated by and are within the scope of the claims.

From the foregoing, it will be seen that this invention is one well adapted to attain all of the ends and objects hereinabove set forth, together with other advantages which are obvious and which are inherent to the safety fuse link.

It will be understood that certain features and sub-combinations are of utility and may be employed without reference to other features and sub-combinations. This is contemplated by and is within the scope of the claims.

As many possible embodiments may be made of the safety fuse link of this invention without departing from the scope thereof, it is to be understood that all matter herein set forth or shown in the accompanying drawings is to be interpreted as illustrative and not in a limiting sense.

What is claimed is:

1. A mechanical safety fuse link apparatus for use as a serial element in a load lifting line, to extend telescopically from a short length to a longer length when load lifted by way of the link causes slipping of a linear slip clutch in the apparatus, the apparatus comprising:
   a) a fuse link for use as a serial element in a load lifting line, comprising a telescoping body, having first and second members, capable of telescoping between a first length and a longer second length, with limiter means to prevent separation of said body; and
   b) a linear slip clutch, in the body, arranged to retain said body in said short length condition until a preselected load is imposed on said load lifting line, and to release said body from said first length when the preselected load is exceeded
   c) wherein said linear slip clutch comprises a resilient member mounted on said first member and disposed into a groove on said second member and arranged to adjustably resist telescoping movement between said first and second members.

2. The safety fuse link of claim 1 wherein said linear slip clutch comprises a collet, mounted on said first member, having resilient extensions urged by radially acting bias means into a receiving recess in the surface of said second member.

3. The safety fuse link of claim 1 wherein a visible indicator, attached to the body, is displayed when said preselected load is exceeded.

4. The safety fuse link of claim 1 wherein said visible indicator comprises at least one vane arranged to extend from said body when said preselected load is exceeded.

5. The safety fuse link of claim 3 wherein said visible indicator comprises a rod extending some distance from said body only when said preselected load is exceeded.

6. The safety fuse link of claim 1 wherein means provided in said body produces an audible signal when the preselected load is exceeded.

7. The safety fuse link of claim 6 wherein said audible signal is initiated by the relative movement between body members when the body is extending in length.

8. The safety fuse link of claim 6 wherein said audible signal is powered means responsive to relative movement of body members when the body is extending.

9. The safety fuse link of claim 6 wherein the means responsive to relative movement of body members comprises a variable volume chamber that moves air through noise producing means when the body changes length.

10. The apparatus of claim 1 wherein said telescoping body comprises a swivel that enables one end of the body to rotate relative to the other end.

11. The apparatus of claim 1 wherein said telescoping body comprises a swivel that enables one end of the body to rotate relative to the other end.

12. A mechanical safety fuse link apparatus for use as a serial element in a load lifting line, to extend telescopically from a short length to a longer length when load lifted by way of the link causes slipping of a linear slip clutch in the apparatus, the apparatus comprising:
   a) a telescoping body, having first and second members, capable of telescoping between a first length and a longer second length, with limiter means to prevent separation of said body; and
   b) a linear slip clutch, in the body, arranged to retain said body in said short length condition until a preselected load is imposed on said load lifting line, and to release said body from said first length when the preselected load is exceeded;
   c) said linear slip clutch comprising a peripheral groove in the surface of said first member, and adjustably bias loaded dogs on said second member arranged to be forced radially out of said groove to allow said slipping, the adjustable bias arranged to deliver force to said dogs through pivoting linkage, said pivoting linkage arranged such that a given bias delivers a maximum radial load to said dogs when the dogs are in the groove, and to deliver less than said maximum radial load to said dogs when the dogs are forced out of said groove.

13. The apparatus of claim 12 wherein said telescoping body comprises a swivel that enables one end of the body to rotate relative to the other end.

14. A mechanical safety fuse link apparatus for use as a serial element in a load lifting line, to extend telescopically from a short length to a longer length when load lifted by way of the link causes slipping of a linear slip clutch in the apparatus, the apparatus comprising
   a) a telescoping body, having first and second members, capable of telescoping between a first length and a longer second length, with limiter means to prevent separation of said body; and
   b) a linear slip clutch, in the body, arranged to retain said body in said short length condition until a preselected load is imposed on said load lifting line, and to release said body from said first length when the preselected load is exceeded;
   c) said linear slip clutch comprising a resilient member mounted on said first member and disposed into a groove on said second member and arranged to adjustably resist telescoping movement between said first and second members.

15. A mechanical safety fuse link apparatus for use as a serial element in a load lifting line, to extend telescopically from a short length to a longer length when load lifted by way of the link causes slipping of a linear slip clutch in the apparatus, the apparatus comprising:

a) a tension link capable of serving as a serial element in a load lifting line, having a telescoping body comprising first and second members, the body capable of telescoping between a first length and a longer second length, with limiter means to prevent separation of said body; and b) a linear slip clutch, in the body, arranged to retain said body in said short length condition until a preselected load is imposed on said load lifting line, and to restorably release said body from said first length when the preselected load is exceeded.

16. A mechanical safety fuse link apparatus for use as a serial element in a load lifting line, to extend telescopically from a short length to a longer length when load lifted by way of the link causes slipping of a linear slip clutch in the apparatus, the apparatus comprising:

a) a telescoping body, having first and second members, capable of telescoping between a first length and a longer second length, with limiter means to prevent separation of said body; and b) a linear slip clutch, in the body, arranged to retain said body in said first length condition until a preselected load is imposed on said load lifting line, and to release said body from said first length when the preselected load is exceeded;

c) said linear slip clutch comprising a resilient member mounted on said first member and disposed into a groove on said second member and arranged to adjustably resist telescoping movement between said first and second members.

\* \* \* \* \*